C. O. NELSON.
SPRING TIRE.
APPLICATION FILED NOV. 10, 1919.
1,370,703.
Patented Mar. 8, 1921.
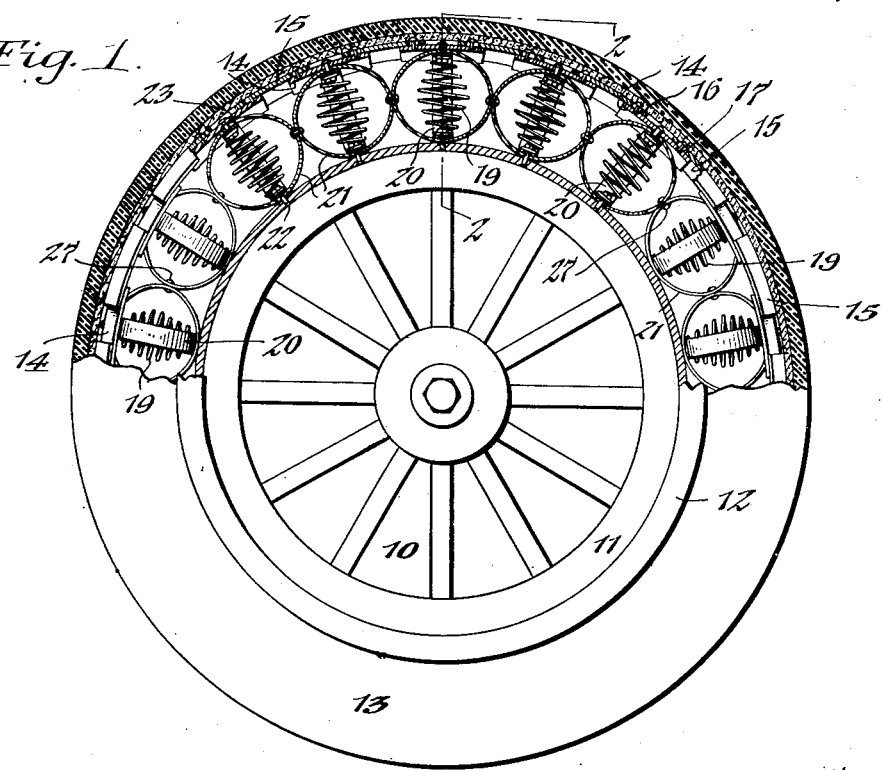
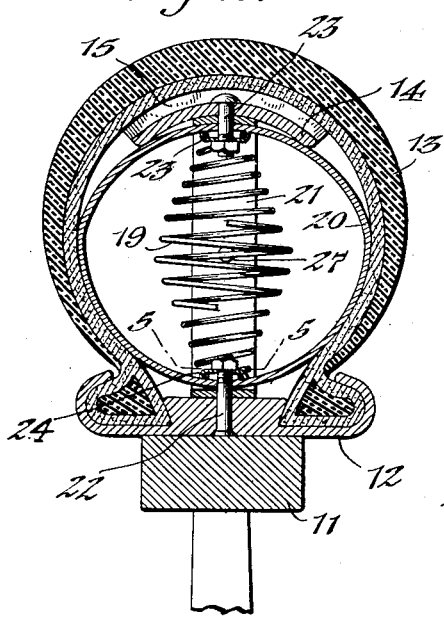
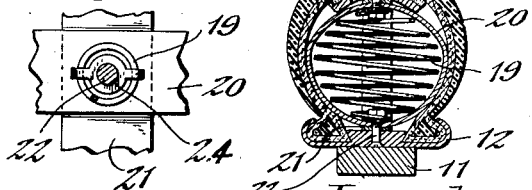
Inventor,
Clara O. Nelson,
by Geyer & Popp
Attorneys.

UNITED STATES PATENT OFFICE.

CLARA O. NELSON, OF BUFFALO, NEW YORK.

SPRING-TIRE.

1,370,703. Specification of Letters Patent. Patented Mar. 8, 1921.

Application filed November 10, 1919. Serial No. 336,929.

*To all whom it may concern:*

Be it known that I, CLARA O. NELSON, a citizen of the United States, residing at Buffalo, in the county of Erie and State of New York, have invented new and useful Improvements in Spring-Tires, of which the following is a specification.

This invention relates to vehicle tires in which a resilient core or body is employed instead of the usual pneumatic inner tube.

The object of the invention is to provide a non-puncturable tire of this character which possesses the resilience and shock-absorbing qualities of a pneumatic tire and yet eliminates the objections thereof.

Another object is to provide a spring tire which insures equal and uniform distribution of the pressure upon all sides of the outer casing and in which the parts are reliably held from displacement, thereby increasing the durability of the tire.

In the accompanying drawings: Figure 1 is a side elevation of the tire, partly in section, showing the same applied to a vehicle wheel. Fig. 2 is an enlarged cross section on line 2—2, Fig. 1. Figs. 3 and 4 are perspective views of the lapped sections comprising the outer flexible supporting band. Fig. 5 is an enlarged horizontal section on line 5—5, Fig. 2. Fig. 6 is a cross section similar to Fig. 2, of a modified construction of the tire.

Similar characters of reference indicate corresponding parts throughout the several views.

10 represents a vehicle wheel of any well known type having the usual felly 11 to which is removably secured the tire retaining rim 12.

Carried by the rim 12 is a tire shoe or casing 13 such as is commonly employed with an inner pneumatic tube. Arranged concentrically within this casing and bearing against its tread portion is a flexible band or ring composed of a plurality of lapped or telescopic sections 14, 15. These sections may be constructed of steel or aluminum, or other suitable material. They are curved to conform to the interior of the tire-casing and are preferably of a width corresponding to its tread portion, as shown in Fig. 2. To permit these sections to have circumferential movement relatively to each other and to permit the band as a whole to expand and contract under varying conditions, the respective inner sections 14 are provided with headed pins 16 which engage corresponding longitudinal slots 17 in the adjacent outer sections 15, each of said inner sections being preferably provided at both ends with such pins, to give all the sections freedom of longitudinal movement at both ends. The heads 18 of these pins prevent radial displacement of the sections relatively to each other.

Interposed between the flexible band and the rim 12 of the wheel are a plurality of coil springs 19, preferably of the double helico-volute type, which are arranged radially of the tire casing and at suitable intervals circumferentially thereof. Each helical spring is preferably removably secured at its inner and outer ends to the rim 12 and the contiguous inner section 14 of the flexible band, respectively, the springs being preferably fastened to said inner sections 14, midway of the ends of the sections.

Surrounding each of the helical springs 19 are two springs 20, 21, preferably oval or elliptical in shape, which are arranged at right angles to each other, the spring 20 being disposed transversely and radially of the tire-casing while the spring 21 is arranged circumferentially thereof. These springs are preferably made in one piece and constructed of flat spring steel or similar material affording the requisite elasticity. The companion oval springs of each helical spring 19 intersect each other in the axis of the helical spring and are securely fastened to the rim and inner section 14 of the flexible band by bolts 22 and 23, respectively. Each of the helical springs may have its inner end removably clamped between a washer 24 of the bolt 22 and the oval spring 20, while the outer end of the helical spring is clamped in like manner. The transversely arranged oval springs 20 bear against opposite sides of the inner wall of the tire-casing, tending to distend the same equally on both sides and assisting the helical springs in supporting the tire, while the oval springs 21 arranged circumferentially thereof serve to distend the tread portion of the casing and also assist the helical springs in supporting the tire. Each spring 21 is preferably connected to the adjacent corresponding springs by rivets 27 or other suitable fastening means.

By this construction and arrangement, an efficient spring tire is produced which yieldingly supports the tread and side portions of the tire and distributes the load imposed thereon equally and uniformly, thereby increasing its durability and producing a smooth-running tire. While affording the advantages of a pneumatic tire as regards the absorption of shocks, this improved tire eliminates the liability to puncture of ordinary pneumatic tires.

If desired, the helical springs may be made of the same dimensions as the interior dimensions of the oval springs, so as to practically fill the latter, as shown in Fig. 6.

I claim as my invention:

1. A vehicle tire, comprising a casing, a flexible telescopic band arranged within said casing and engaging the tread portion thereof, helical springs within said casing bearing against said flexible band, and a pair of oval springs surrounding each of said helical springs, one of said oval springs of each pair being arranged transversely of said casing and the other circumferentially thereof.

2. A vehicle tire, comprising a flexible tire-casing, a flexible band arranged within said casing against its tread-portion, said band consisting of telescopic sections slidable longitudinally on one another, a circular row of substantially oval springs arranged side by side in the tire casing and each having its outer portion attached to a section of said band, and means for connecting said springs at their contiguous sides.

3. A vehicle tire, comprising a flexible tire-casing, a flexible band arranged within said casing against its tread portion, said band consisting of telescopic sections slidable longitudinally on one another, radial springs arranged in the tire-casing and having their outer portions attached to the inner sections of said band, midway of the ends of the sections, and a circular row of substantially oval springs arranged side by side in the tire casing and each surrounding one of said radial springs, each of said oval springs having its outer portion attached to a section of said band, and means for connecting said oval springs at their contiguous sides.

CLARA O. NELSON.